United States Patent [19]
David et al.

[11] Patent Number: 5,468,360
[45] Date of Patent: Nov. 21, 1995

[54] ELECTROLYTIC CHLORINATION

[76] Inventors: Lennie F. David, 4 Crimea Street, St. Kilda, Victoria 3182; Peter J. Roberts, 38 Robinson Street, East Brighton, Victoria 3187, both of Australia

[21] Appl. No.: 303,821

[22] Filed: Sep. 9, 1994

[30] Foreign Application Priority Data

Sep. 9, 1993 [AU] Australia .................. PM1103

[51] Int. Cl.⁶ ........................................ C02F 1/461
[52] U.S. Cl. .................. 204/228; 204/229; 204/242
[58] Field of Search .......................... 204/228, 229, 204/242; 417/50

[56] References Cited

U.S. PATENT DOCUMENTS

| | | | |
|---|---|---|---|
| 3,663,127 | 5/1972 | Cheers | 417/372 |
| 3,753,062 | 8/1973 | Greenwell | 318/225 R |
| 4,213,745 | 7/1980 | Roberts | 417/363 |
| 4,500,404 | 2/1985 | Tucker | 204/266 |
| 4,599,159 | 7/1986 | Hilbig | 204/266 |
| 4,997,540 | 3/1991 | Howlett | 204/271 |
| 5,221,444 | 6/1993 | Silveri | 204/149 |

*Primary Examiner*—Kathryn Gorgos
*Assistant Examiner*—Arun S. Phasge
*Attorney, Agent, or Firm*—Larson and Taylor

[57] ABSTRACT

An a.c. induction motor for use with a pump of a pool filtration system, the motor comprising a rotor and a stator, the stator (45) having at least two windings including a primary stator winding (46) and a secondary winding (50) magnetically coupled to the primary stator winding, whereby when the motor operates, a stepped down a.c. voltage is induced into the secondary winding. A pool filtration and chlorination system comprising an electrolytic chlorinating cell (10) arranged to be positioned within a filter line of a pool or spa, the filter line including a pump (11) driven by an a.c. induction motor, the secondary winding being electrically connected to the electrolytic cell, whereby operation of the motor causes a stepped down voltage to be induced in the secondary winding which powers the electrolytic cell.

4 Claims, 3 Drawing Sheets

ELECTROLYTIC CHLORINATION

FIELD OF THE INVENTION

This invention relates to electrolytic chlorination. In particular, the invention relates to the combination of an electrolytic chlorinator and a water pump for use in the treatment of swimming pool and spa water.

BACKGROUND OF THE INVENTION

It is common practice to chlorinate large bodies of water such as those used in swimming pools and spas to reduce the occurrence and growth of micro-organisms. There are a number of problems encountered by the addition of quantities of chlorine or chlorine-containing compounds to a body of water at regular intervals in order to maintain the required chlorine concentration. One solution to these problems is the use of electrolysis to chlorinate the water. Electrolysis requires salinating the pool water to between 0.2% and 0.8% by weight of sodium chloride and then passing the salinated water through an electrolytic cell that has spaced electrodes coupled to a source of d.c. voltage. The current flowing between the electrodes forms a hypochlorite solution which has the effect of killing off and preventing the growth of micro-organisms. There are many types and forms of electrolytic cells that may be used in the chlorination of pools and spas. Some are positioned in the plumbing associated with the filtration plant of the pool, while others are suspended or immersed directly into the body of water. For domestic swimming pools and spas, the electrolytic cell usually runs at a d.c. voltage of between 4 to 12 volts, enabling a current of between 5 to 40 amps to flow between the electrodes of the cell. The supply of the d.c. voltage is usually from a power pack that would include a step down transformer and a rectifier to step down the a.c. mains voltage to the d.c. voltage of between 4 and 12 volts.

One problem with electrolytic chlorination equipment is that, due to the generation of hydrogen gas, it is important that the electrolytic process does not continue when there is no flow of water through the cell. Thus, if the pump that is associated with the filtration system of a pool fails or is stopped for some reason, the flow of water ceases, which means that a small body of water is subjected to lengthy electrolysis in the cell. As the hydrogen gas produced by this extended electrolytic process is not being swept away by flowing water, given certain plumbing arrangements, a dangerous situation can result if the (potentially explosive) gas is able to accumulate in large "dead" spaces (like the filter tank). For this reason, power packs for electrolytic chlorinators usually include circuitry or componentry whose purpose is to interrupt the current to the cell in the event that the filter pump fails or stops. Circuitry or commonentry is also required to prevent overheating of the power pack in the event of current overload. The need for power packs, overload circuitry and means to interrupt current to the cell in the event of the filter pump failing adds considerably to the cost of electrolytic chlorination systems.

It is these problems that have brought about the present invention.

SUMMARY OF THE INVENTION

According to one aspect of the present invention there is provided an a.c. induction motor for use with a pump of a pool filtration system, the motor comprising a rotor and a stator, the stator having at least two windings including a primary stator winding and a secondary winding magnetically coupled to the primary stator winding, whereby when the motor operates, a stepped down a.c. voltage is induced into the secondary winding.

Preferably, the secondary winding is coupled to a rectifier to convert the a.c. voltage to d.c. voltage. The rectifier may be housed within or attached to a heat sink, preferably forming part of the motor housing.

The induced d.c. voltage is used to power an electrolytic chlorinator cell.

In accordance with a further aspect of the present invention there is provided a pool filtration and chlorination system comprising an electrolytic chlorinating cell arranged to be positioned within a filter line of a pool or spa, the filter line including a pump driven by an a.c. induction motor, the secondary winding being electrically connected to the electrolytic cell, whereby operation of the motor causes a stepped down voltage to be induced in the secondary winding which powers the electrolytic cell.

The additional winding is preferably coupled to a rectifier and a suitable heat sink. The rectifier and heat sink are preferably housed within the casing of the motor.

DESCRIPTION OF DRAWINGS

An embodiment of the present invention will now be described by way of example only with reference to the accompanying drawings in which.

DESCRIPTION OF EMBODIMENTS

Figure 1:
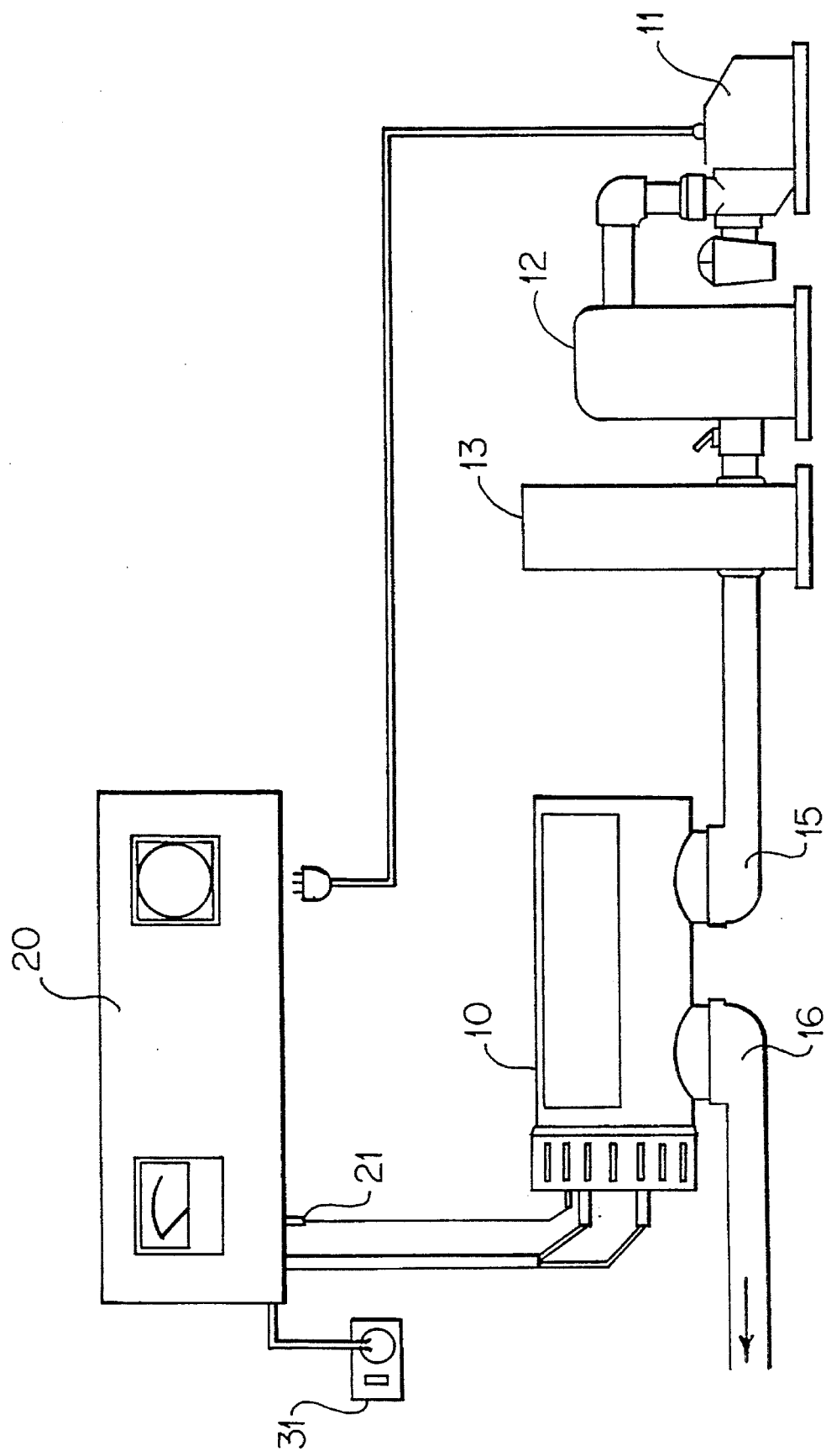
FIG. 1 is a schematic circuit layout of a pool or spa filtration system of conventional format.

A conventional pool or spa filtration system is illustrated in FIG. 1. An electrolytic chlorinating cell 10 is positioned within the filtration circuit of the pool or spa. Water is drawn from the pool by a pump 11 which includes an electric motor. The pump 11 is then coupled to a filter 12 of conventional format which may in turn be coupled to a heating unit 13 that may be gas, electric or solar Bowered. The output of the heating unit 13 and/or filter 12 is coupled to the input 15 of the electrolytic cell 10 and the output 16 of the cell returns the filtered, heated and chlorinated water back to the pool. The motor that drives the pump is usually powered by a source of mains electricity which is taken from a power pack 20 that includes a step down transformer to provide the d.c. voltage to the electrolytic cell. The electrolytic cell 10 conventionally runs on a d.c. voltage of between 4 and 12 volts that enables a current of between 5 and 40 amps to flow between the electrodes of the cell. The power pack 20 usually includes circuitry and/or componentry to prevent overload and also to interrupt the current to the cell 10 in the event that the filter pump 11 fails or that the motor overload protective device should stop the pump. The importance of this safety feature is that if the pump 11 fails or stops for some reason and the electrolytic cell 10 continues to operate, hydrogen gas is produced at the electrodes which when confined in the pipework associated with the filtration system can cause a dangerous environment which could result in an explosion. It is thus important that the electrolytic cell 10 ceases to operate at the same time that the pump 11 stops. It is for this reason that the power pack 20 includes sophisticated cut-out systems. It is also important that, for the system to work, there needs to be a flow detector 21 that senses a cessation of flow through the cell caused by the stopping of the motor.

Figure 2:
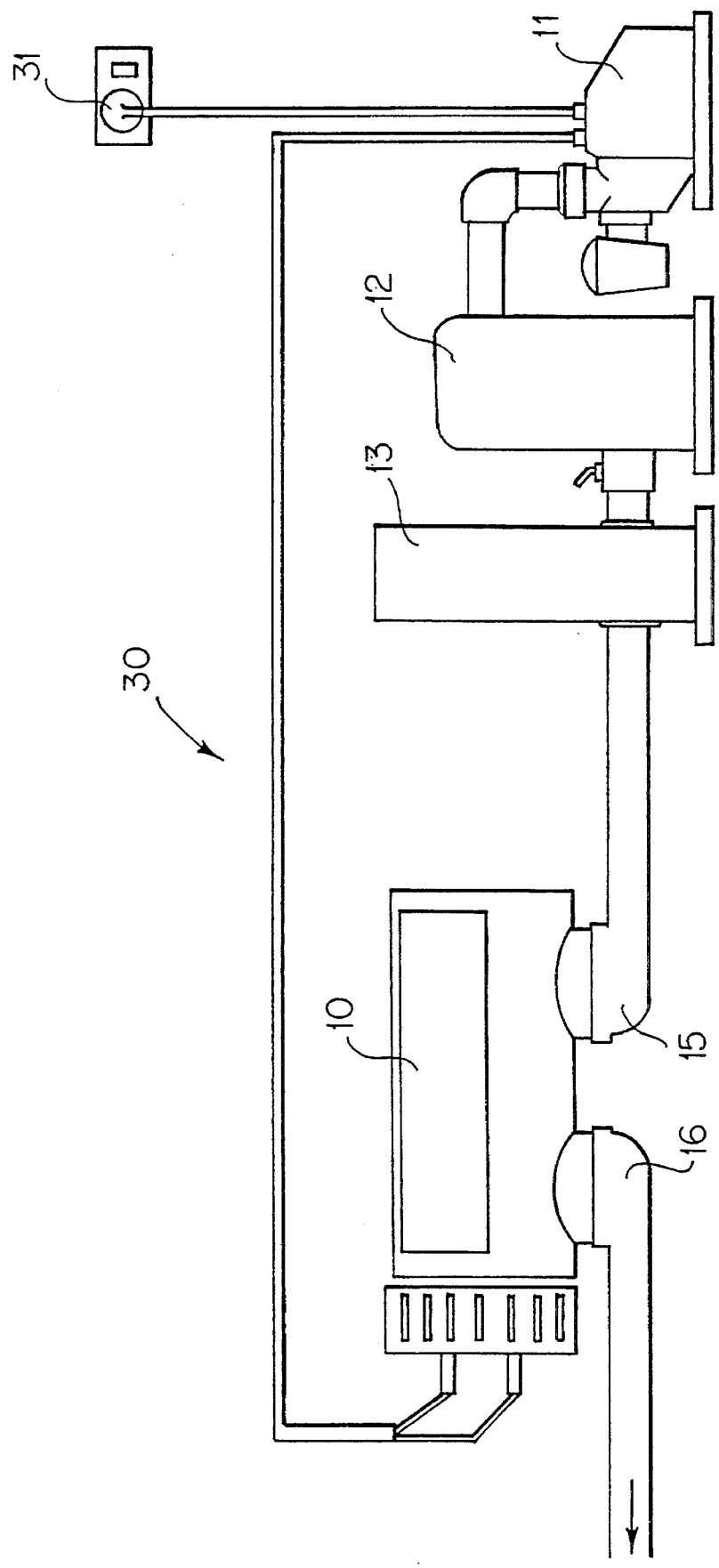
FIG. 2 is a schematic circuit layout of a pool or spa filtration system incorporating the present invention.

In FIG. 2, a streamlined and less costly filtration system 30 is illustrated, whereby the pump 11 and its associated electric motor is coupled to a source 31 of mains electricity and the motor also provides a stepped down d.c. voltage that is fed to the electrolytic cell 10. The electrolytic cell is placed in series with the heater 13 if fitted, filter 12 and pump in the same manner as illustrated with respect to FIG. 1. The major difference between the system of FIG. 2 and that described with respect to FIG. 1 is the absence of the comparatively expensive power pack. The a.c. induction motor that drives the pump 11 has been adapted to have a separate winding which acts like a step down transformer. A stepped down a.c. voltage is induced in this additional winding, which is then rectified to a d.c. voltage to power the electrolytic cell. The importance of this feature is that the power to the cell is dependent on the motor operating. As soon as the motor stops, no voltage is induced into the secondary winding which means that the cell does not operate. Thus, there is no need for flow detectors or overload devices other than those that would conventionally be provided in the a.c. induction motor. Nor is there a need for a power pack with its own step down transformer because the cell is simply driven by electrical connection to the secondary winding that is provided in the motor. It is envisaged that the system of FIG. 2 would reduce the cost of an electrolytic chlorinator by as much as 50%.

Figure 3:
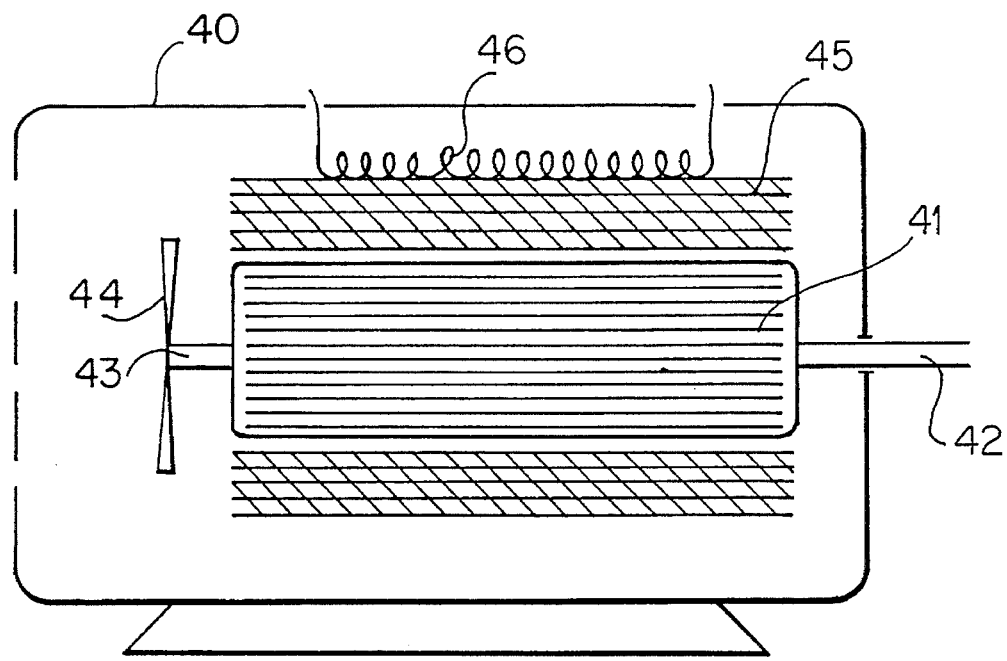
FIG. 3 is a schematic side-on illustration of a conventional a.c. induction motor.
Figure 4:
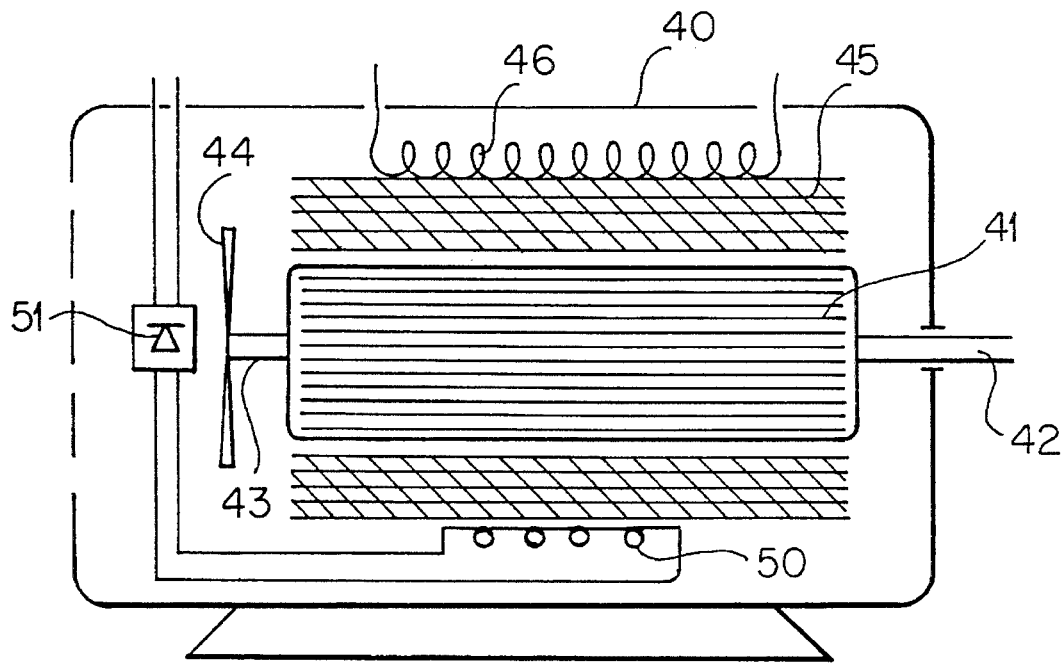
FIG. 4 is a slide-on representation of a conventional a.c. induction motor modified in accordance with the present invention.

A conventional a.c. induction motor is shown in FIG. 3 and the modification that is made to the motor in this invention is shown in FIG. 4. The motor of FIG. 3 comprises a casing 40, a rotor 41 coupled to shafts 42 and 43 with a cooling fan 44. The rotor 41 is mounted to spin within an electromagnetic stator 45 that in turn carries a primary winding 46. When an a.c. voltage is applied to the primary winding 46, the electromagnetic field causes the rotor 41 to spin in a conventional manner.

The modification shown in FIG. 4 includes a secondary winding 50 magnetically coupled to the primary winding 46 of the stator 45. The secondary winding 50 is coupled to a rectifier 51 and is then directly coupled across the electrolytic cell as shown in FIG. 2. When the motor 15 is operating, the secondary winding 50 acts with the primary winding 46 in the stator 45 in the same manner as a step down transformer. Thus, a step down a.c. voltage is induced into the secondary winding 50. The rectifier 51 converts this a.c. voltage into a d.c. voltage which can then be fed to the electrodes of the electrolytic cell.

The rectifier 51 requires a heat sink to absorb the heat that is generated by the rectification process. In a preferred embodiment, the rectifier 51 is located within the casing 40 of the motor adjacent the cooling fan 44 so that the motor casing, in essence, acts in conjunction with the fan to cool the rectifier. However, it is understood that the rectifier 51 and the heat sink can be positioned externally of the motor such as within the electrolytic cell 10 or elsewhere. The rectifier may comprise discrete rectifying diodes or a bridge rectifier. The design and operation of the rectifier would be well known to those skilled in this art.

The overload cut-out that is normally incorporated in the motor winding would double as overload protection for the transformer part of the arrangement as both the motor and the transformer would share the same winding.

Having described our invention what we claim is:

1. A pool filtration and chlorination system comprising an electrolytic chlorinating cell positioned within a filter line of a pool or spa, the filter line including a pump driven by an a.c. induction motor, the motor comprising a rotor and a stator, the stator having at least two windings including a primary stator winding and a secondary winding magnetically coupled to the primary stator winding such that operation of said motor causes a stepped down voltage to be induced in the secondary winding, and the secondary winding being electrically connected to the electrolytic cell to power the electrolytic cell.

2. The system according to claim 1 wherein the secondary winding is coupled to a rectifier to convert a.c. voltage to d.c. voltage.

3. The system according to claim 2 wherein the rectifier is housed within or attached to a heat sink.

4. The system according to claim 3 wherein the heat sink forms part of the housing of the motor.

* * * * *